Dec. 29, 1936.  N. R. BECK  2,065,504
METHOD OF AND MEANS FOR PRODUCING PARTITIONED GLASS CONTAINERS
Filed May 1, 1935
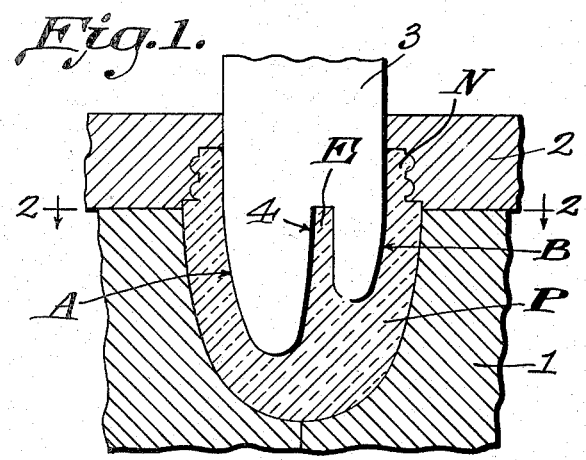
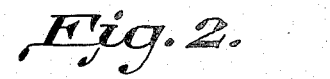
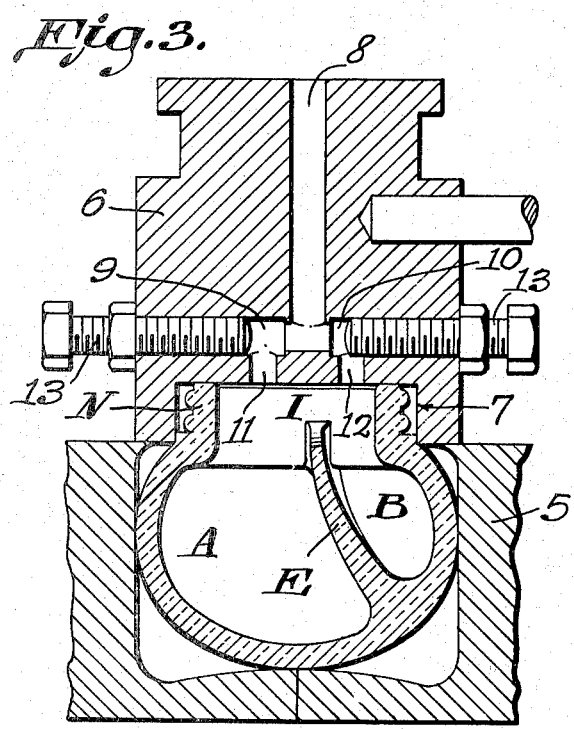
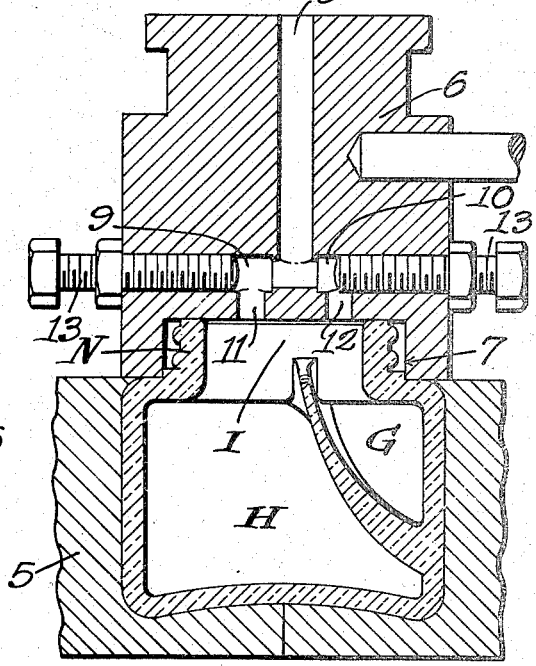
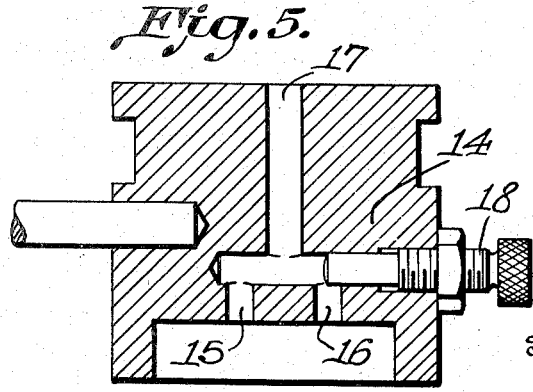
Inventor
Norman R. Beck
By C. A. Snow & Co.
Attorneys Patented Dec. 29, 1936

2,065,504

UNITED STATES PATENT OFFICE 2,065,504

METHOD OF AND MEANS FOR PRODUCING PARTITIONED GLASS CONTAINERS

Norman R. Beck, Baltimore, Md., assignor to Carr-Lowrey Glass Co., Baltimore, Md.

Application May 1, 1935, Serial No. 19,295

3 Claims. (Cl. 49—9)

This invention relates to a method of and means for producing partitioned glass containers and is designed more particularly as an improvement upon the method disclosed in Patent 2,023,474 issued to Carl G. Hilgenberg and Charles B. Garwood on December 10, 1935.

In the method disclosed in the application referred to separate recesses are initially produced in a parison and are subsequently enlarged by air pressure to form compartments the shapes and relative sizes of which are predetermined by the relative volumes of the recesses initially provided. In this method the air admitted into the two pockets comes from a single port or outlet in a blow head and while generally stated the objects produced by the method have been satisfactory, there have been some cases of failure due to the fact that the stream of air under pressure has sometimes tended to distort the partition and change the predetermined capacities of the respective compartments.

It is an object of the present invention to improve upon the method referred to by providing means whereby air streams in controllable volumes can be directed into the respective recesses so that the pressures by air within these recesses will vary in proportion to the predetermined sizes of the compartments, thereby avoiding the distortion of the partitions which has at times occurred heretofore with the result that imperfect products have been produced.

It is a further object of the invention to use in connection with the blow mold in which the parison is placed, a blow head having separate ports and provided with valve means by which the relative sizes of the air streams issuing from the ports into the parison can be varied at will to insure a perfect product.

With the foregoing and other objects in view which will appear as the description proceeds, the invention resides in certain novel steps of the method and in certain new and novel details of construction and combinations of parts hereinafter more fully described and claimed, it being understood that changes may be made without departing from the spirit of the invention as claimed.

In the accompanying drawing the several steps involved in the method of producing glass containers have been illustrated and special forms of blow heads used in carrying out the method have also been illustrated.

In said drawing

Figure 1 is a section through a parison and its mold while subjected to pressure of the shaping plunger.

Figure 2 is a section on line 2—2, Figure 1.

Figure 3 is a section showing the parison partly blown in a finishing mold equipped with a blow head such as constitutes the present invention and showing one stage in the process of shaping the partition initially formed by the plunger.

Figure 4 is a view similar to Figure 3 showing the finished article in section within its mold.

Figure 5 is a section through a modified form of blow head.

In carrying out the method constituting the present invention the metal gather or blank P is deposited in a parison mold 1 with a portion surrounded by a neck ring 2. A neck pin or plunger 3 is used to shape the confined parison so as to produce a parison with a desired neck finish N and with spaced recesses A and B. In Figure 1 the recesses A and B have been shown of different volumes, recess B being of less depth and area than recess A. While the recesses in the figures are of certain predetermined volumes it is to be understood that their relative sizes can be changed to meet the requirements. In any case the plunger is formed with a slot 4 extending across the active end thereof so that when the parison is shaped by the pin or plunger 3, partition E will be extended from one side to the other of the parison and serve to separate the recesses A and B.

Following the shaping of the parison it is conveyed by the neck ring to a finish or blow mold 5 where it is subjected to the action of air under pressure supplied through blow head 6. This blow head is provided with a recess 7 adapted to receive the neck finish N and extending partly through the blow head is an air passage 8 having oppositely extending branches 9 and 10 at one end. A port 11 opens from the branch 9 into recess 7 at one side of the center thereof while another port 12 opens from the branch 10 into recess 7 at the other side of the center thereof. These ports are so positioned that when the blow head has been properly placed relative to the deposited parison, port 11 will be located to direct a jet of air into the recess A while port 12 will be located to direct a jet of air into recess B, the top edge of the partition E being arranged between the paths of these jets.

In the constructions shown in Figures 3 and 4 a screw valve 13 is provided for each of the ports 11 and 12. Obviously therefore these valves can be adjusted to control the flow of air to the respective ports.

After the parison has been placed in the mold 5 as heretofore stated and the blow head has been brought into position, jets of air will issue from the respective ports 11 and 12, the volumes of air issuing through these ports being proportioned in substantially the same relation to each other as are the volumes or capacities of the respective recesses A and B. Consequently during the blowing operation the partition E will be drawn downwardly and laterally in Figure 3 until the excess metal of the parison has been spread over the inner surface of the finishing mold and the article brought to its final shape as shown in Figure 4.

The operation described insures perfect formation of every article because of the correct distribution of air due to the employment of the separate ports and the control valves.

By varying the relative volumes of the recesses A and B the ultimate proportions and shape of the partition E can be varied correspondingly. For example, by making the recess B smaller than illustrated the resultant partition would be curved downwardly and laterally more abruptly than has been shown with the result that the smaller or supplemental compartment G produced from recess B will be further reduced in size relative to the larger or main compartment H over which the partition over-lies. In any case, however, both compartments open into the neck opening I of the finished container so that an object, such as a pen, can be introduced into either compartment. In every case, however, the valves 13 are adjusted to coincide with the changes in the relative areas of the compartments to be produced and, therefore, production can be carried on without danger of occasional undesirable distortion of the partition E.

Instead of providing separate valves for the two ports as described, the modified structure shown in Figure 5 may be employed. In that structure the blow head 14 has separate ports 15 and 16 communicating with the air passage 17 as in the form heretofore described, but only a single valve is used. This valve, which has been shown at 18, controls the flow of air to the port 16. Therefore while the flow of air through port 15 remains constant, the flow of air through port 16 can be increased or reduced so as to maintain a proper relationship between the volumes of air discharged from the respective ports.

What is claimed is:

1. The method of producing a partitioned glass container which includes the steps of forming recesses of different areas in a parison and subsequently directing into the respective recesses jets of air of different volumes respectively to enlarge the recesses into different shapes respectively predetermined by the wall areas of the respective recesses and the relative volumes of the air streams directed into the recesses.

2. In apparatus for producing partitioned glass containers, a mold for receiving a parison having spaced recesses, a blow head having separate ports for discharging air into the respective recesses, and valve means for controlling the volume of the air streams relative to each other when delivered through the ports into the recesses.

3. In apparatus for producing partitioned glass containers, a mold for receiving a parison having spaced recesses, a blow head having separate ports for discharging air into the respective recesses, an air passage leading to the ports, and separate valves in the blow head for controlling the flow of air through the respective ports.

NORMAN R. BECK.